United States Patent
Yu et al.

(10) Patent No.: US 7,872,961 B2
(45) Date of Patent: Jan. 18, 2011

(54) ORTHOGONAL FREQUENCY DIVISION MULTIPLE ACCESS MESSAGE PROCESSING METHOD AND APPARATUS

(75) Inventors: Xiaoyong Yu, Grayslake, IL (US);
Xiangyang Chen, Vernon Hills, IL (US);
Jian J. Wu, Reading (GB)

(73) Assignee: Motorola Mobility, Inc., Libertyville, IL (US)

( * ) Notice: Subject to any disclaimer, the term of this patent is extended or adjusted under 35 U.S.C. 154(b) by 1037 days.

(21) Appl. No.: 11/427,530

(22) Filed: Jun. 29, 2006

(65) Prior Publication Data

US 2008/0002564 A1 Jan. 3, 2008

(51) Int. Cl.
*H04J 11/00* (2006.01)
(52) U.S. Cl. .................. 370/206; 370/208; 370/210; 370/503; 375/260; 375/355
(58) Field of Classification Search ................ None
See application file for complete search history.

(56) References Cited

U.S. PATENT DOCUMENTS

| | | | |
|---|---|---|---|
| 7,149,266 B1 * | 12/2006 | Imamura et al. | 375/355 |
| 7,269,125 B2 * | 9/2007 | Smallcomb | 370/208 |
| 2005/0135230 A1 * | 6/2005 | Yu et al. | 370/210 |
| 2005/0169408 A1 * | 8/2005 | Kim | 375/343 |
| 2006/0002359 A1 * | 1/2006 | Kim et al. | 370/343 |
| 2006/0153227 A1 | 7/2006 | Hwang et al. | 370/465 |
| 2007/0041312 A1 * | 2/2007 | Kim | 370/208 |
| 2007/0223602 A1 * | 9/2007 | Yu et al. | 375/260 |

* cited by examiner

*Primary Examiner*—Chi H. Pham
*Assistant Examiner*—Shick Hom

(57) ABSTRACT

A base station receives (201) OFDMA messages from a plurality of end user platforms that share all used tones within at least one OFDMA symbol. By one approach this base station then uses (202) a fixed starting time to select contiguous samples from received aggregate multi-user signals wherein the fixed starting time is offset from a reference time that comprises a time at which the base station expects to be receiving the signals from all end users. In combination with the time offset approach noted above or in lieu thereof the base station can process (204) selected contiguous samples using fast Fourier transform and then provide (205) phase rotation with respect to those processed samples. When applying phase rotation, by one approach a phase rotation can be applied (401) to the aggregate multi-user signal and, in addition, individual phase rotation can be applied (402) as determined on a user-by-user basis.

20 Claims, 3 Drawing Sheets

ORTHOGONAL FREQUENCY DIVISION MULTIPLE ACCESS MESSAGE PROCESSING METHOD AND APPARATUS

TECHNICAL FIELD

This invention relates generally to orthogonal frequency division multiple access communications.

BACKGROUND

Orthogonal frequency division multiple access (OFDMA) communications are known in the art. Such OFDMA systems typically represent data content using so-called OFDMA symbols. In some cases (as with, for example, 802.16e-based OFDMA systems), the tones in a given OFDMA symbol are shared by multiple users. This, in turn, leads to corresponding time synchronization needs as a receiving base station will typically receive a signal that comprises an aggregation of all the presently transmitting end user platforms.

In an attempt to meet this need, each such end user platform typically receives base station instructions (via, for example, a ranging exercise) regarding adjustments to be made to the end user platform's transmissions. These adjustments are intended to cause all end user platform transmissions to arrive in synchronicity at the base station. Unfortunately, such synchronicity typically does not literally occur notwithstanding such adjustments. Ranging errors and channel delay spread as corresponds to each end user platform, for example, tends to cause at least a certain degree of non-synchronicity.

A base station in such a system typically cannot separate end user platform transmissions prior to employing fast Fourier transform processing and therefore must essentially tolerate such timing errors. When the timing error becomes relatively large, however, this typically leads inevitably to performance degradation. Such degradation can often be observed even when, for example, the timing error is small enough to be within a cyclic prefix interval as corresponds to common orthogonal frequency division multiple access protocols.

BRIEF DESCRIPTION OF THE DRAWINGS

The above needs are at least partially met through provision of the orthogonal frequency division multiple access message processing method and apparatus described in the following detailed description, particularly when studied in conjunction with the drawings, wherein.

Figure 1:
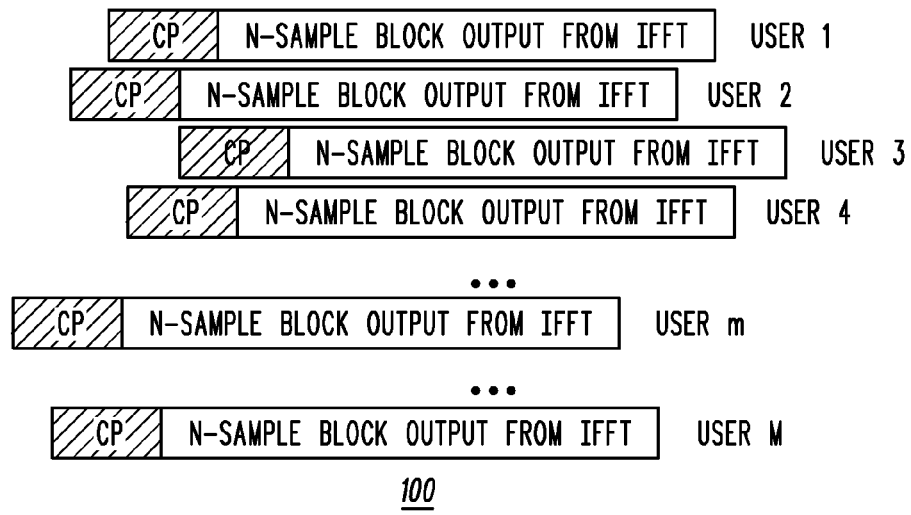
FIG. 1 comprises a schematic signal depiction as configured in accordance with the prior art.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a base station receives orthogonal frequency division multiple access signals from a plurality of end user platforms that share all used tones within at least one orthogonal frequency division multiple access symbol. By one approach this base station then uses a fixed starting time to select contiguous samples from received aggregate signals to provide selected contiguous samples wherein the fixed starting time is offset from a reference time that comprises a time at which the base station expects to be receiving the messages from all end users.

By one approach (in combination with the time offset approach noted above or in lieu thereof) the base station selects contiguous samples from the received aggregate signals to thereby provide corresponding selected contiguous samples, processes these selected contiguous samples using fast Fourier transform, and provides phase rotation with respect to those processed samples. By one approach phase rotation can be applied to the multi-user composite signal (to compensate for using the fixed start time noted above) and, in addition, individual phase rotation can be applied as determined on a user-by-user basis.

These approaches, alone or in combination with one another, appear to significantly reduce the impact of timing errors. In particular, simulation results using an 802.16e link level simulator indicate a reduction in bit error rate when using these approaches as compared to bit error rates that would otherwise appear to occur when such timing errors are present. This, in turn, leads to considerably improved receiver performance. Those skilled in the art will appreciate that such benefits accrue without requiring any corresponding physical or functional changes with respect to already-deployed end user platforms.

These and other benefits may become clearer upon making a thorough review and study of the following detailed description. Referring now to the drawings, and prior to discussing these teachings in greater detail, however, it may be helpful to first further elaborate with respect to the aforementioned synchronization problem. As shown in FIG. 1, and notwithstanding the kinds of ranging-based transmission time adjustments that are often supported by prior art systems, OFDMA signals 100 from different end user platforms often (in fact, typically) arrive in a non-synchronous manner with respect to one another. Even when the cyclic prefix (CP) portion of such signals are all at least partially overlapping with one another, such non-synchronicity can lead to receiver processing errors in OFDMA systems where the tones in individual OFDMA symbols are shared by multiple users and the receiver sees only an aggregate signal comprised of all transmitting end user platforms.

Figure 2:
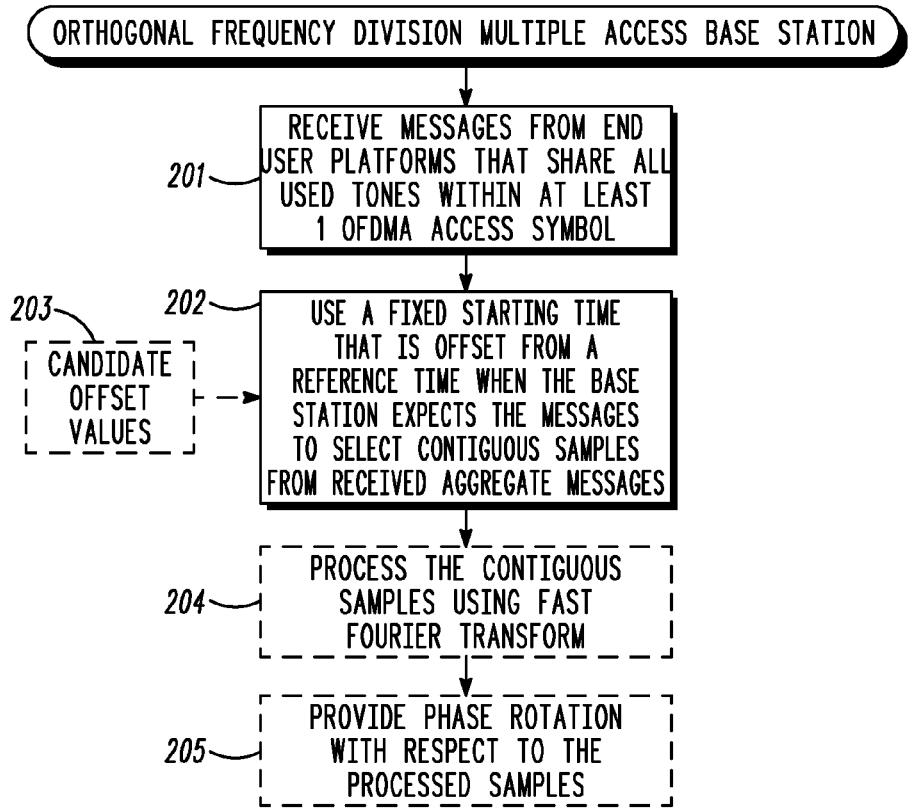
FIG. 2 comprises a flow diagram as configured in accordance with various embodiments of the invention.
Figure 3:
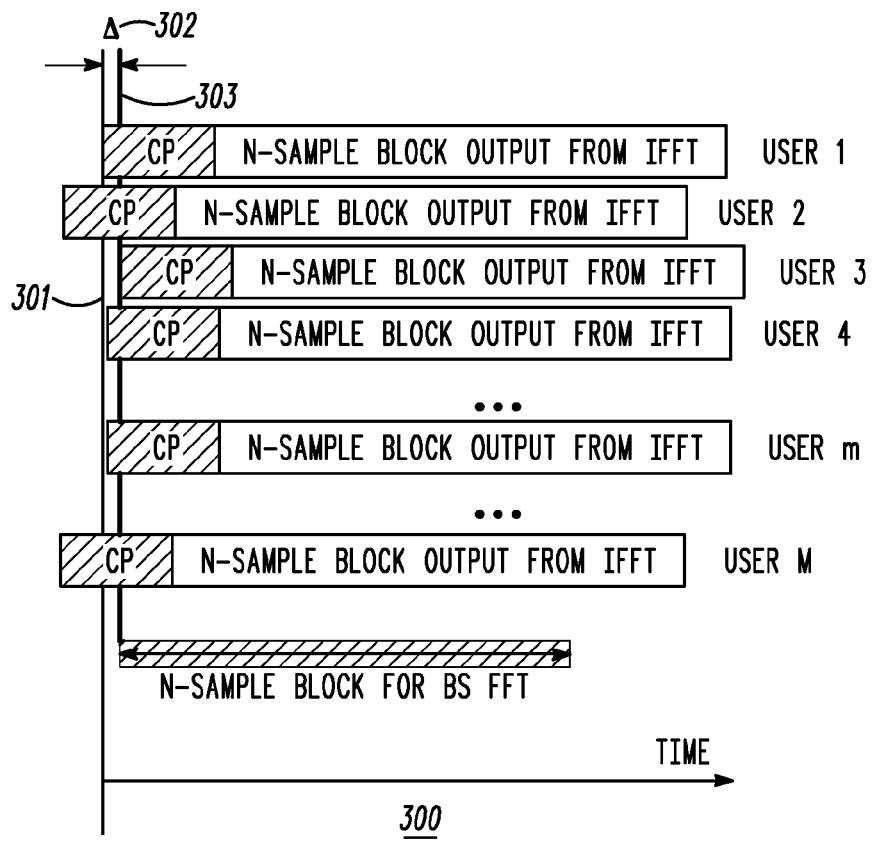
FIG. 3 comprises a schematic signal depiction as configured in accordance with various embodiments of the invention.

Referring now to FIG. 2, a process 200 in accordance with these teachings provides for reception 201 at an OFDMA base station as is known in the art of signals from a plurality of end user platforms that share all used tones within at least one OFDMA symbol. By one approach, this process 200 then provides for using 202 a fixed starting time to select contiguous samples from received aggregate signals to provide selected contiguous samples. By one approach, and referring momentarily to FIG. 3, this fixed starting time 303 is offset from a reference time 301 by an offset value A 302 that comprises a time at which the base station expects to be receiving the signals 300 from all end users.

Referring again to FIG. 2, by one approach this offset value can comprise a relatively static value as may be set by a system administrator or calculated by the base station or other system resource. By another approach this offset value can be selected from amongst a plurality of candidate offset values 203. In a typical OFDMA application setting the transmitted messages will each comprise, in part, a cyclic prefix. Accordingly, if desired, this offset value can be selected as a function, at least in part, of one or more of the cyclic prefix length, a known, calculated, measured, or estimated system ranging error, and/or a maximum channel delay.

Figure 4:
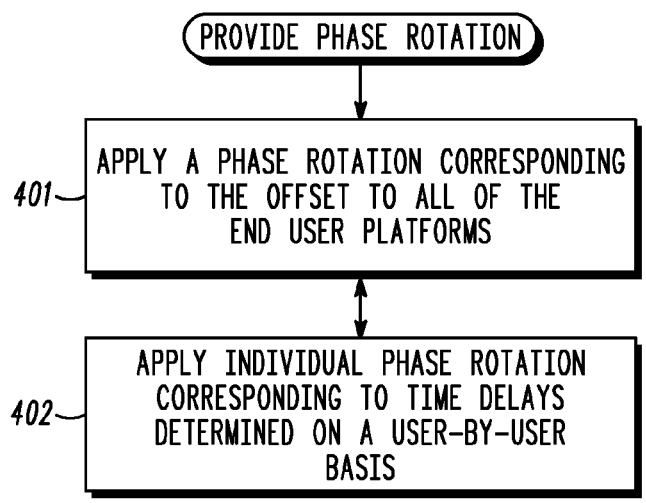
FIG. 4 comprises a flow diagram as configured in accordance with various embodiments of the invention.

If desired, in combination with usage of the aforementioned offset approach or in lieu thereof, this process 200 can optionally further provide for processing 204 the selected contiguous samples using fast Fourier transform to provide processed samples and then providing 205 phase rotation with respect to such processed samples. In application settings where this process 200 includes use of the offset value approach, and referring now to FIG. 4, this provision of phase rotation can comprise first applying 401 a phase rotation that corresponds to the offset value to all of the end user platforms to compensate for having used the aforementioned fixed starting time.

The base station can then apply 402 individual phase rotation as corresponds to time delays that are determined on a user-by-user basis. This can comprise, for example, determining the individual phase rotations as a function, at least in part, of a timing error estimate as individually corresponds to each end user platform. Such can be accomplished, for example, by using linear regression to determine the time error estimate(s) as individually correspond to each end user platform.

Figure 5:
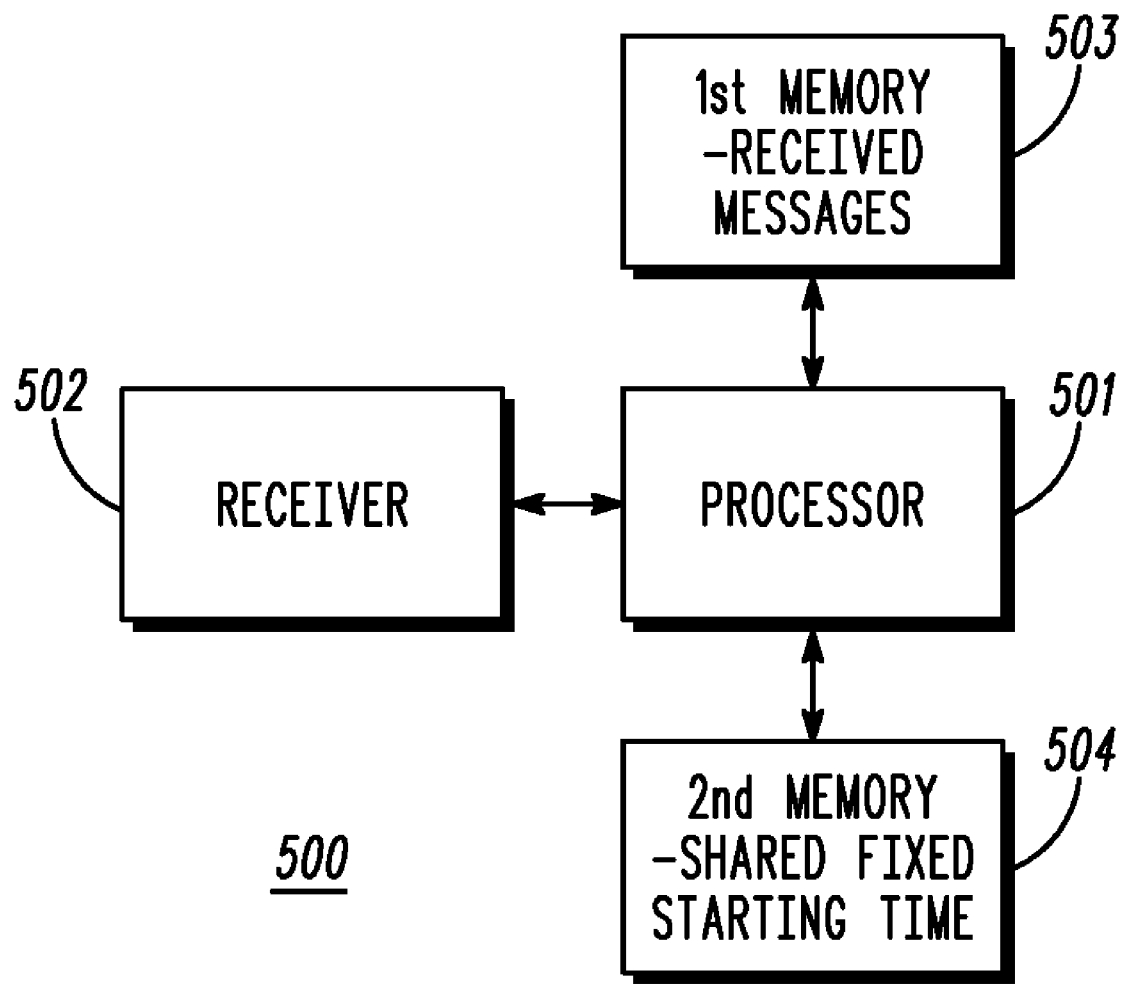
FIG. 5 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 5, an illustrative approach to such a platform will now be provided.

In this illustrative embodiment, an OFDMA base station 500 comprises, in relevant part, a processor 501 that operably couples to a receiver 502 and a first and second memory 503 and 504. The receiver 502 serves to receive the aforementioned OFDMA signals in aggregate form. The first memory 503 serves to store such signals. The second memory 504 serves to store the aforementioned shared fixed starting time.

So configured, the processor 501 may be configured and arranged (via, for example, appropriate programming) to use the shared fixed starting time to select contiguous samples from received aggregate messages to provide resultant selected contiguous samples. This processor 501 may be further configured and arranged to process such selected contiguous samples using fast Fourier transform to provide resultant processed samples and to then provide phase rotation with respect to such processed samples (again as described above if so desired).

Those skilled in the art will recognize and understand that such an OFDMA base station 500 may be comprised of a plurality of physically distinct elements as is suggested by the illustration shown in FIG. 5. It is also possible, however, to view this illustration as comprising a logical view, in which case one or more of these elements (such as, for example, the first and second memory 503 and 504) can be enabled and realized via a shared platform. It will also be understood that such a shared platform may comprise a wholly or at least partially programmable platform as are known in the art.

For the purpose of illustration and example and by way of further elaboration without intending any loss of generality, consider now two end user platforms with different timing errors as seen at a base station receiver. The received baseband signal can be expressed as:

$$y(t) = (x^{(1)}(t+\tau_1)e^{j2\pi f(t+\tau_1)} + x^{(2)}(t+\tau_2)e^{j2\pi f(t+\tau_2)})e^{-j2\pi ft}$$
$$= x^{(1)}(t+\tau_1)e^{j\phi_1} + x^{(2)}(t+\tau_2)e^{j\phi_2}$$

where $x^{(1)}(t)$ and $x^{(2)}(t)$ are time domain mobile signals; $\tau_1$ and $\tau_2$ denote the timing offset of end user platforms 1 and 2; and $\phi_1$ and $\phi_2$ are related phase offsets due to the timing errors. In the discrete time domain, the received signal may be expressed as:

$$y_k = x_{k+\tau_1}^{(1)} e^{j\Phi_1} + x_{k+\tau_2}^{(2)} e^{j\Phi_2}$$

When the offset magnitude is within the cyclic prefix interval, due to the cyclic property of OFDM symbols the soft quadrature amplitude modulation (QAM) symbol for the nth tone may be expressed as:

$$\tilde{s}_n = \frac{1}{\sqrt{N}} \sum_{k=-N/2}^{N/2-1} y_k e^{-j2\pi \frac{n}{N} k}$$
$$= \frac{1}{N} \sum_{k=-N/2}^{N/2-1} \left[ e^{j\phi_1} \sum_{i=-N/2}^{N/2-1} s_i^{(1)} e^{j2\pi \frac{k+\tau_1}{N} i} + e^{j\phi_2} \sum_{i=-N/2}^{N/2-1} s_i^{(2)} e^{j2\pi \frac{k+\tau_2}{N} i} \right] e^{-j2\pi \frac{n}{N} k}$$
$$= \delta_n^1 e^{j\phi_1} s_n^{(1)} e^{j2\pi \frac{\tau_1}{N} n} + \delta_n^2 e^{j\phi_2} s_n^{(2)} e^{j2\pi \frac{\tau_2}{N} n}$$

where $\delta_n^1$ and $\delta_n^2$ equal 1 or 0 indicating if the nth tone is assigned to the first or second end user platform, respectively; and $s_n^{(1)}$ and $s_n^{(2)}$ are QAM symbols on the nth tone if the tone is used by either end user platform (though not where both are used for non-space division multiple access systems). This indicates that when the timing error is within the ambit of the cyclic prefix, fast Fourier transform orthogonality is preserved and only phase rotation on the desired tone exists, which is a linear function of the tone index n and the rotation direction is determined by the sign of $\tau_1$ and $\tau_2$.

When the timing offset magnitude is larger than the cyclic prefix, the samples input for fast Fourier transform processing for current OFDMA symbol will typically contain a portion of samples from one or more adjacent OFDMA symbols. Conceptually, this will cause interference in terms of inter-symbol interference (ISI) and inter-carrier interference (ICI). For example, consider an OFDM receiver for simplicity and assume the samples for an mth OFDM symbol to be:

$$r = [y_\tau(m), y_{\tau+1}(m), \ldots, y_{N-1}(m), y_0(m+1), y_1(m+1), \ldots, y_{\tau-1}(m+1)]$$

where the first N−τ samples are from the current OFDM symbol and the remaining τ samples are from the (m+1)th OFDM symbol. Then, the nth tone of mth OFDM symbol can be expressed as:

$$\tilde{s}_n(m) = \frac{1}{N}\sum_{k=0}^{N-1} r_k(m)e^{-j2\pi \frac{n}{N}k}$$

$$= \frac{1}{N}\sum_{k=\tau}^{N-1} y_k(m)e^{-j2\pi \frac{n}{N}(k-\tau)} + \frac{1}{N}\sum_{k=0}^{\tau-1} y_k(m+1)e^{-j2\pi \frac{n}{N}(k+N-\tau)}$$

$$= \frac{1}{N}\sum_{k=\tau}^{N-1}\left[\sum_{i=0}^{N-1} s_i(m)e^{j2\pi \frac{k}{N}i}\right]e^{-j2\pi \frac{n}{N}(k-\tau)} +$$

$$\frac{1}{N}\sum_{k=0}^{\tau-1}\left[\sum_{i=0}^{N-1} s_k(m+1)e^{j2\pi \frac{k}{N}i}\right]e^{-j2\pi \frac{n}{N}(k-\tau)}$$

$$= \frac{N-\tau}{N}s_n(m)e^{j2\pi \frac{\tau}{N}n} + \frac{1}{N}\sum_{\substack{i=0,i\neq n}}^{N-1} s_i(m)e^{j2\pi \frac{\tau}{N}n}\sum_{k=\tau}^{N-1} e^{j2\pi \frac{i-n}{N}k} +$$

$$\frac{1}{N}\sum_{k=0}^{\tau-1}\left[\sum_{i=0}^{N-1} s_i(m+1)e^{j2\pi \frac{k}{N}i}\right]e^{-j2\pi \frac{n}{N}(k-\tau)}$$

It can be readily seen that the first term is the desired part that has been scaled and rotated by a phase proportional to the tone index n for a given offset τ, while the second and third term are interference results from a self OFDM symbol, which comprises the aforementioned inter-carrier interference, and the adjacent OFDM symbol, which comprises the aforementioned inter-symbol interference.

As noted above, with the help of ranging (where all end user platform signals targeting a particular base station attempt to arrive at the same time) OFDMA base station correct timing can be achieved by taking N samples for fast Fourier transform processing beginning at a fixed offset Δ from the reference time instance with which all end user platforms are trying to line up. This fixed offset Δ is used for ranging error compensation. When the maximum channel delay spread in a given system is cyclic minus 2Δ (i.e., CP−2Δ), the N-sample block taken for fast Fourier transform processing will typically never contain samples in other OFDMA symbol intervals, and consequently no appreciable ISI and/or ICI occurs. In other words, OFDMA receiver correct timing can be achieved.

Parameter Δ is preferably selected to be the maximum tolerable system timing error. If the channel delay spread is very small and negligible, Δ can be cyclic prefix/2 to maximize ranging error tolerance. On the other hand, if Δ can be reduced in view of better ranging performance, the cyclic prefix can be shortened to reduce the corresponding cyclic prefix penalty that inherently exists in any OFDM system. In practical implementation, the fixed offset Δ may be programmable at the base station to accommodate different application scenarios.

As noted above one may also perform phase rotation for each tone after the fast Fourier transform processing step. Conceptually, there may be two phase rotations (though these teachings will readily permit combining these two rotations into a single step if desired) with a first phase rotation (that corresponds to the fixed offset Δ) being applied to all tones and the other phase rotation being end user platform based and being associated with individual end user platform timing error.

The first phase rotation for all tones after completing the fast Fourier transform processing can be expressed as:

$\Phi_k = \exp(j2\pi(CP-\Delta)k/N)$ for tone k across all data tones.

The second phase rotation per end user platform can be expressed as:

$\Psi_k = \exp(j2\pi\tau_m k/N)$ for tone k if the tone is used by end user platform m Where CP corresponds to the cyclic prefix and $\tau_m$ is the timing error associated with end user platform m. Depending on the sign of $\tau_m$, the phase rotation per end user platform is either counterclockwise or clockwise. The next step is to estimate the individual mobile timing error $\tau_m$. This can be achieved, for example, by either using a message/packet/symbol preamble (such as in AAS (Adaptive Antenna System) AMC (Adaptive Modulation and Coding) mode), pilot symbols (for example, PUSC (Partial Usage of SubChannels) mode in 802.16e) or the like.

For any given timing error $\tau_m$, the phase rotation is a linear function of tone index. In general, if the phase difference at known data tones is denoted by $y_i$ and the associated tone index is represented by $x_i$, then the timing error estimate is translated to find a line y=bx+a such that the distances among the line and all pairs ($y_i$, $x_i$) are "smallest." Mathematically, this can be expressed as:

$$\min_{b,a}\left\{\sum_{i=1}^{Q} |y_i - (bx_i + a)|^2\right\}$$

where Q is the number of points in the scattering, or the number of preamble or pilot symbols used in the timing error estimate. The solution can be easily obtained by solving:

$$\begin{cases} \dfrac{\partial \sum_{i=1}^{Q} |y_i - (bx_i + a)|^2}{\partial b} = 0 \\ \dfrac{\partial \sum_{i=1}^{Q} |y_i - (bx_i + a)|^2}{\partial a} = 0 \end{cases}$$

One therefore has:

$$\begin{cases} b = \dfrac{L_{xy}}{L_{xx}} \\ a = \bar{y} - b\bar{x} \end{cases}$$

where:

$$\bar{x} = \frac{1}{Q}\sum_{i=1}^{Q} x_i \qquad \bar{y} = \frac{1}{Q}\sum_{i=1}^{Q} y_i$$

$$L_{xy} = \sum_{i=1}^{Q}(x_i - \bar{x})(y_i - \bar{y}) \qquad L_{xx} = \sum_{i=1}^{Q}(x_i - \bar{x})^2$$

The estimated timing error is therefore $\tau_m = Nb/2\pi$.

In some application settings, as when employing PUSC mode in 802.16e, a preamble is not available and the pilot density is relatively high. In such a case the timing error estimate can be simplified by only using pilot symbols per tile. For example, each PUSC tile contains 12 positions in a tone-time grid and this corresponds to 12 QAM symbols. Four of these symbols are used for pilots that are modulated in a binary phase-shift keying (BPSK), and the remaining eight positions are for data that could be quadrature phase shift keyed (QPSK), 16QAM, 64QAM symbols, or the like. For uplink PUSC permutation, one slot is defined as six "tiles," where each tile consists of four adjacent subcarriers in the frequency domain across three adjacent OFDMA symbol durations in the time domain. The six physical positions of the six tiles in one subchannel will typically randomly change every slot. This effective tone hopping facilitates inter-cell interference mitigation. Due to this tone hopping, the timing error estimate for individual end user platforms may be based on each tile using the corresponding pilot symbols.

To demonstrate, the phase difference between a received signal and a known pilot symbol can be determined for four pilot positions in a tile:

$\varphi_{t,k} = <P_{t,k} \times \tilde{P}_{t,k}^*$, where t is tile index and k=1,2,3, and 4 for pilot positions in a tile where $\tilde{P}_{t,k}^*$ represents conjugate received pilot symbol in tile t at position k. Then the timing error estimate for a particular end user platform can be expressed as:

$$\tau_m = \frac{N}{4T_\pi} \sum_{t=1}^{T} \frac{(\varphi_{t,1} - \varphi_{t,2} + \varphi_{t,3} - \varphi_{t,4})}{3}$$

where T is the number of total tiles as correspond to end user platform m.

Those skilled in the art will understand and recognize that these teachings provide a relatively flexible and efficient way to improve receiver performance without necessarily requiring a concurrent improvement with respect to the prior art reception synchronicity performance. This, in turn, permits these teachings and benefits to be applied and attained without requiring any attendant modification of already deployed end user platforms.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   receiving, by an orthogonal frequency division multiple access (OFDMA) base station, signals from a plurality of end user platforms that share all used tones within at least one orthogonal frequency division multiple access symbol to produce received aggregate signals;
   using, by the OFDMA base station, a fixed starting time to select contiguous samples from the received aggregate signals to provide selected contiguous samples wherein the fixed starting time is offset from a reference time that comprises a time at which the base station expects to be receiving the signals from all end users;
   processing, by the OFDMA base station, the selected contiguous samples using fast Fourier transform to produce processed samples;
   applying, by the OFDMA base station, a phase rotation to the processed samples.

2. The method of claim 1 further comprising:
   selecting the offset from amongst a plurality of candidate offset values.

3. The method of claim 2 wherein the signals comprise a cyclic prefix and wherein selecting the offset from amongst a plurality of candidate offset values comprises selecting the offset as a function, at least in part, of at least one of:
   cyclic prefix length;
   system ranging error; and
   maximum channel delay.

4. The method of claim 1 wherein applying a phase rotation to the processed samples comprises:
   applying a phase rotation corresponding to the offset to all of the end user platforms to compensate for using the fixed starting time;
   applying individual phase rotation corresponding to time delays determined on a user-by-user basis.

5. The method of claim 4 wherein applying individual phase rotation on a user-by-user basis comprises determining the individual phase rotation for each end user platform as a function, at least in part, of a timing error estimate as individually corresponds to each end user platform.

6. The method of claim 5 wherein determining the individual phase rotation for each end user platform as a function, at least in part, of a timing error estimate as individually corresponds to each end user platform comprises using linear regression to determine the timing error estimate as individually corresponds to each end user platform.

7. An orthogonal frequency division multiple access base station comprising:
   a receiver;
   a first memory operably coupled to the receiver and having stored therein received signals from a plurality of end user platforms that share all used tones within at least one orthogonal frequency division multiple access symbol;
   a second memory having a shared fixed starting time stored therein wherein the shared fixed starting time is offset from a reference time that comprises a time at which the base station expects to be receiving the signals;
   a processor operably coupled to the receiver, the first memory, and the second memory and being configured and arranged to use the shared fixed starting time to select contiguous samples from an aggregate of the signals received from the plurality of end user platforms to provide selected contiguous samples, process the selected contiguous samples using fast Fourier transform to provide processed samples, and apply a phase rotation to the processed samples.

8. The orthogonal frequency division multiple access base station of claim 7 wherein the offset is selected from amongst a plurality of candidate offset values.

9. The orthogonal frequency division multiple access base station of claim 8 wherein the received signals comprise a cyclic prefix and wherein the offset is selected from amongst the plurality of candidate offset values as a function, at least in part, of at least one of:
   cyclic prefix length;
   system ranging error; and
   maximum channel delay.

10. The orthogonal frequency division multiple access base station of claim 7 wherein the processor is further configured and arranged to apply a phase rotation to the processed samples by:
    applying a phase rotation corresponding to the offset to the aggregate multi-user signal to compensate for using the fixed starting time;

applying individual phase rotation corresponding to time delays determined on a user-by-user basis.

11. The orthogonal frequency division multiple access base station of claim 10 wherein the processor is further configured and arranged to apply individual phase rotation on a user-by-user basis by determining the individual phase rotation for each recovered single user signal as a function, at least in part, of a timing error estimate as individually corresponds to each end user platform.

12. The orthogonal frequency division multiple access base station of claim 11 wherein the processor is further configured and arranged to determine the individual phase rotation for each user as a function, at least in part, of a timing error estimate as individually corresponds to each recovered single user signal by using linear regression to determine the timing error estimate as individually corresponds to each end user platform.

13. The orthogonal frequency division multiple access base station of claim 7 wherein the processor comprises means for using a fixed starting time to select contiguous samples from the aggregate of signals received from the plurality of end user platforms wherein the fixed starting time is offset from a reference time that comprises a time at which the base station expects to be receiving the signals from all end users.

14. A method comprising:
  receiving, by an orthogonal frequency division multiple access (OFDMA) base station, signals from a plurality of end user platforms that share all used tones within at least one orthogonal frequency division multiple access symbol;
  selecting, by the OFDMA base station, contiguous samples from an aggregate of the signals received from the plurality of end user platforms to provide selected contiguous samples, wherein selecting comprises using a fixed starting time to select the contiguous samples, which fixed starting time is offset from a reference time;
  processing, by the OFDMA base station, the selected contiguous samples using fast Fourier transform to produce processed samples;
  applying, by the OFDMA base station, a phase rotation corresponding to the offset to the processed samples to compensate for using the fixed starting time.

15. The method of claim 14 wherein applying a phase rotation to the processed samples comprises:
  applying a phase rotation to the processed samples;
  applying individual phase rotation determined on a user-by-user basis.

16. The method of claim 15 wherein applying individual phase rotation determined on a user-by-user basis comprises determining the individual phase rotation for each user as a function, at least in part, of a timing error estimate as individually corresponds to each end user platform.

17. The method of claim 16 wherein determining the individual phase rotation for each user as a function, at least in part, of a timing error estimate as individually corresponds to each end user platform comprises using linear regression to determine the timing error estimate as individually corresponds to each end user platform.

18. The method of claim 14 wherein selecting contiguous samples from the received aggregate signals comprises using a fixed starting time to select contiguous samples from the received aggregate signals wherein the fixed starting time is offset from a reference time that comprises a time at which the base station expects to be receiving the signals from all users.

19. The method of claim 1 wherein applying a phase rotation to the processed samples comprises applying a phase rotation corresponding to the offset to all of the end user platforms to compensate for using the fixed starting time.

20. The orthogonal frequency division multiple access base station of claim 7 wherein the processor is arranged to apply a phase rotation to the processed samples by applying a phase rotation corresponding to the offset to all of the end user platforms to compensate for using the fixed starting time.

* * * * *